Feb. 21, 1950
C. C. S. LE CLAIR
2,498,086
VEHICLE LIFT
Filed Oct. 12, 1946
6 Sheets-Sheet 1
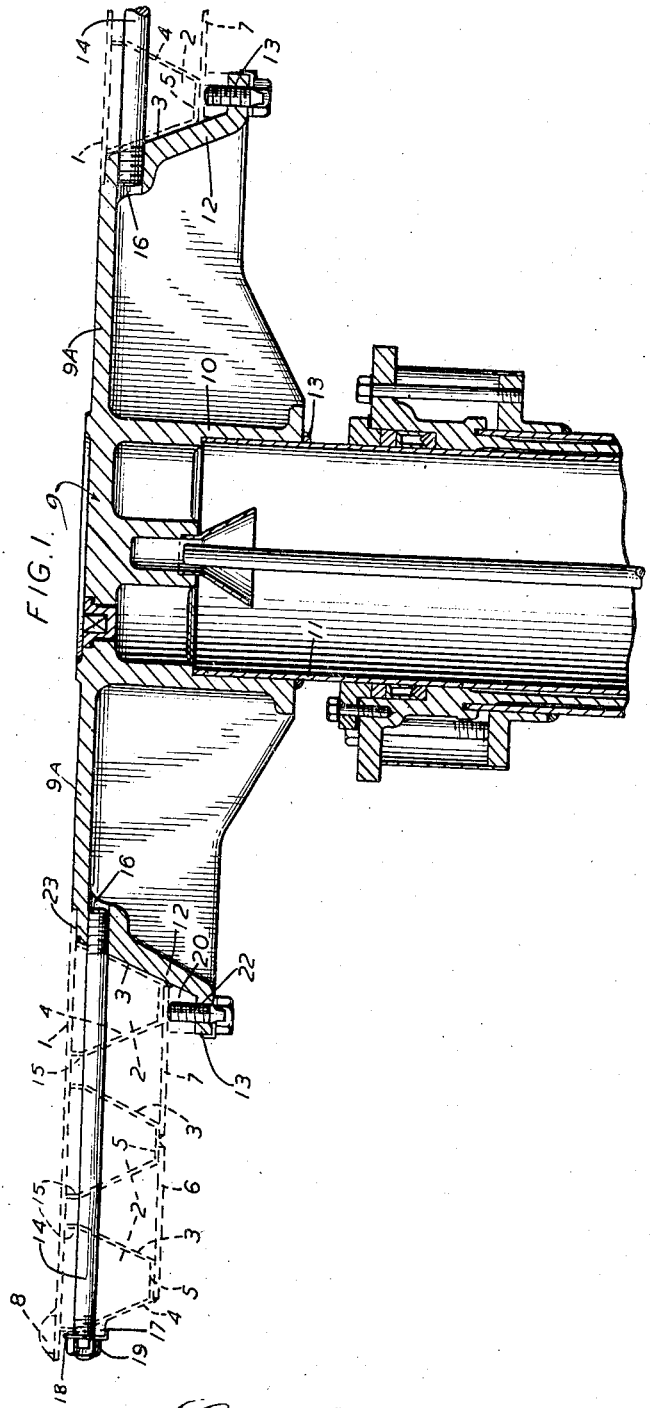
Inventor:
Camille Clare Sprankling Le Clair
By Hinkle, Horton, Ahlberg, Hansmann & Whipper
Attorneys.

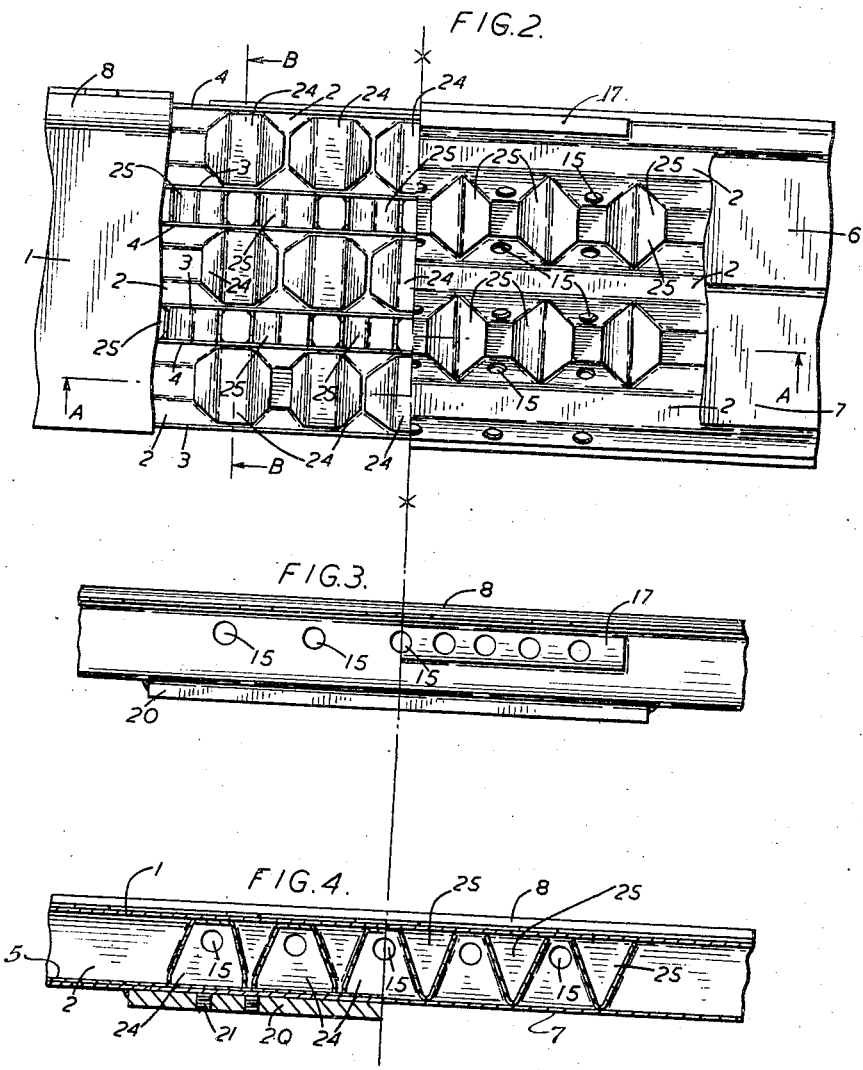

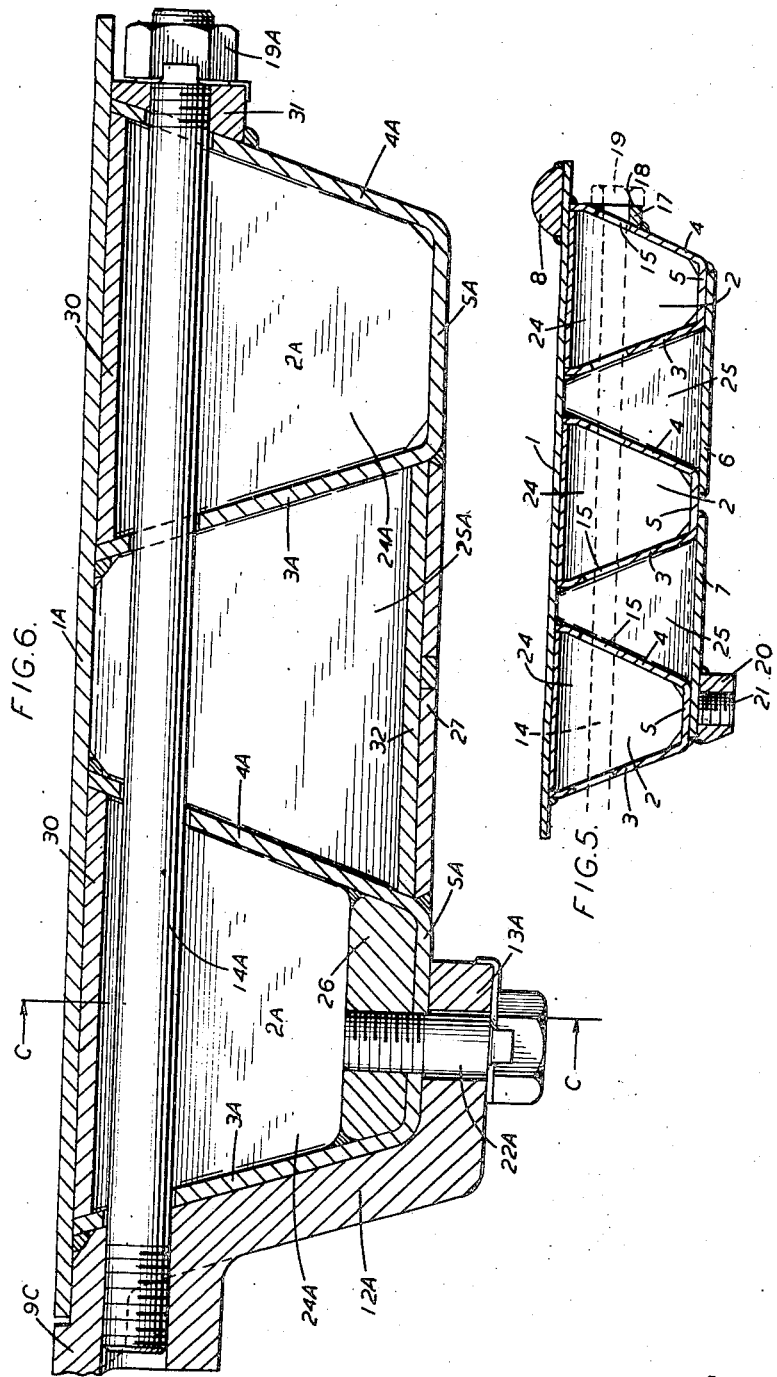

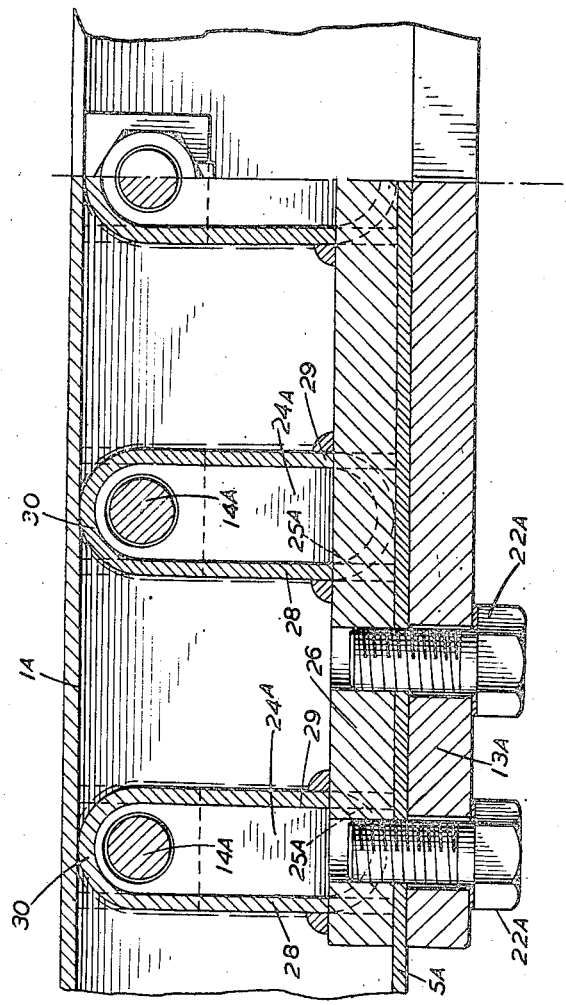

Feb. 21, 1950  C. C. S. LE CLAIR  2,498,086
VEHICLE LIFT
Filed Oct. 12, 1946  6 Sheets-Sheet 5
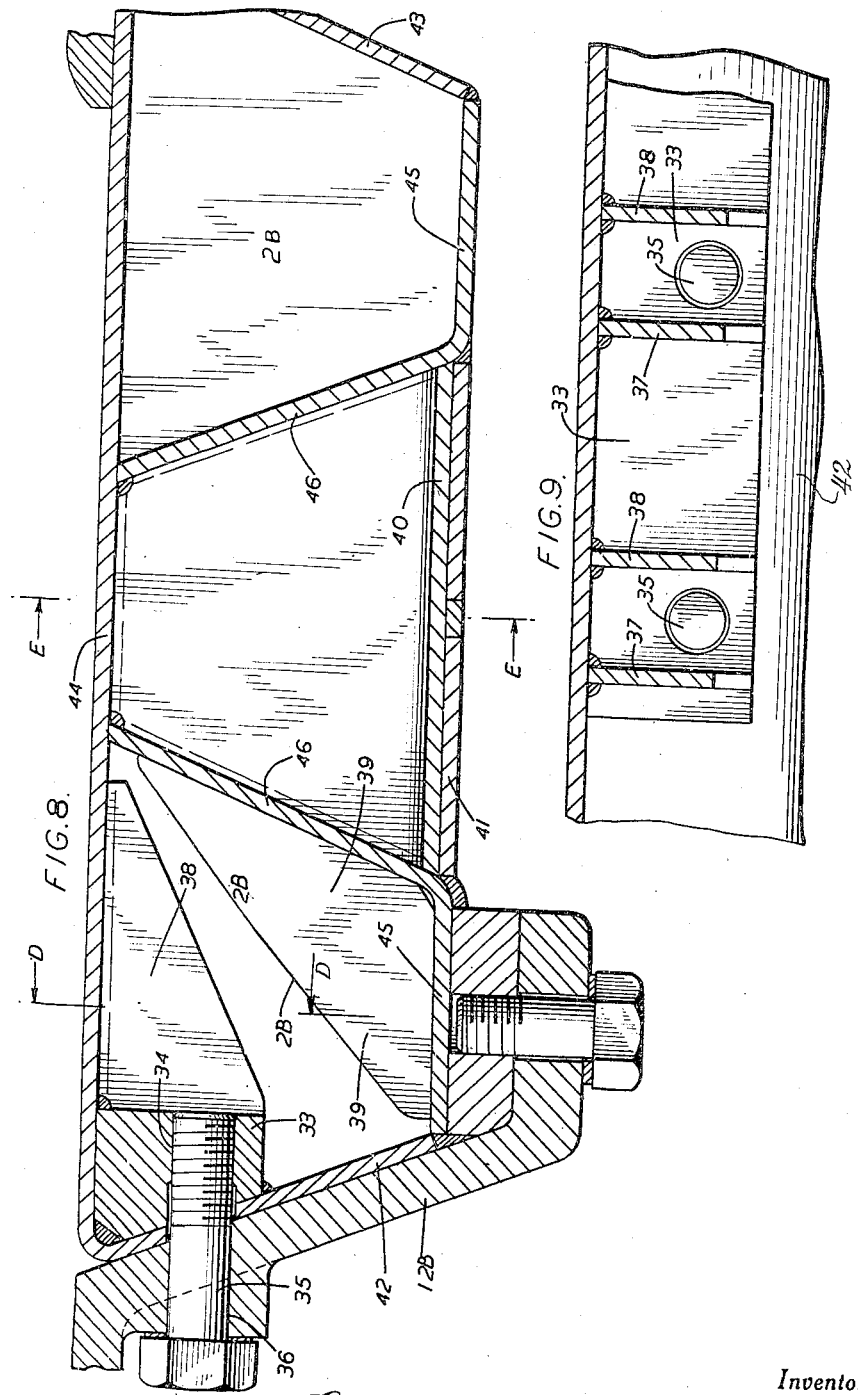
Inventor:
Camille Clare Sprankling Le Clair
By Hinkle, Horton, Ahlberg, Hansmann & Wupper
Attorneys.

Feb. 21, 1950        C. C. S. LE CLAIR        2,498,086
VEHICLE LIFT
Filed Oct. 12, 1946                                              6 Sheets-Sheet 6
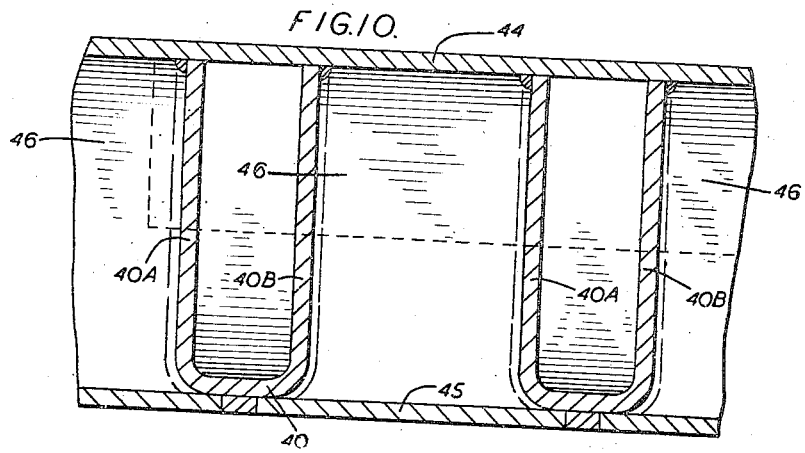
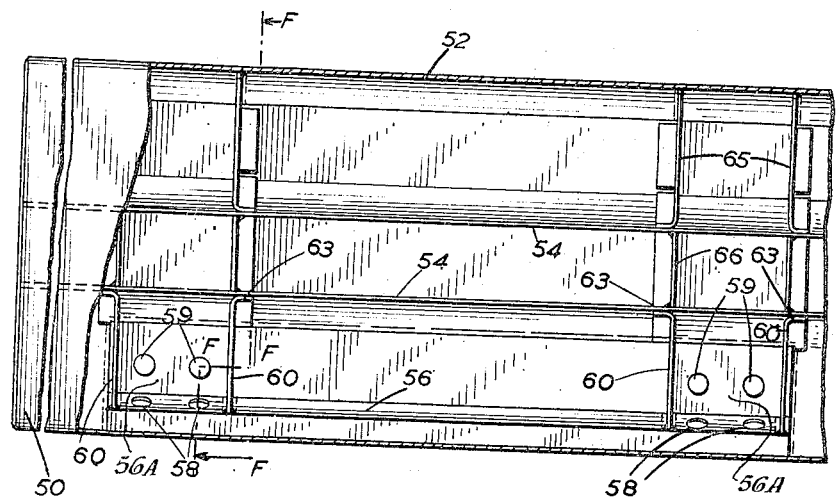
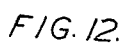
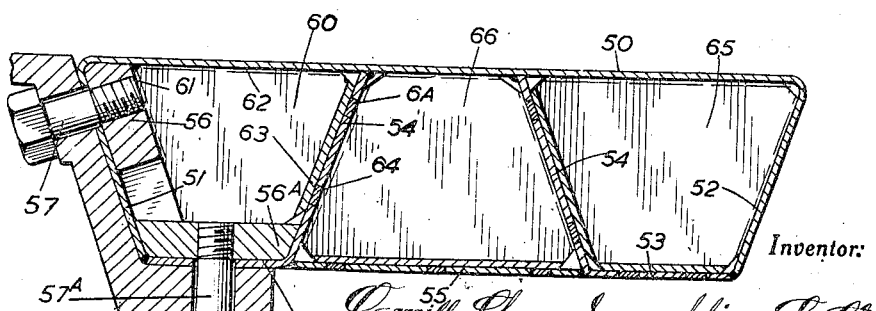
Inventor:
Camille Clare Sprankling Le Clair
By Hinkle, Horton, Ahlberg, Hartmann & Kupper
Attorneys.

Patented Feb. 21, 1950

2,498,086

UNITED STATES PATENT OFFICE 2,498,086

VEHICLE LIFT

Camille Clare Sprankling Le Clair, Acton, London, England, assignor to Tecalemit Limited, Brentford, England, a corporation of Great Britain Application October 12, 1946, Serial No. 703,062
In Great Britain November 1, 1945

18 Claims. (Cl. 254—89)

This invention relates to lifts and particularly to lifts for vehicles for use in garages, automobile works and other establishments in which it is necessary, for some purpose or other, to elevate vehicles above floor or ground level. All such lifts will be referred to hereinafter as "vehicle lifts."

One object of the present invention is to provide an improved form of construction of the superstructure for such lifts which are of what is commonly known as the "drive-on" type, in which a vehicle may be driven on to the lift prior to raising, as distinct from the "wheel-free" type, in which the vehicle is lifted by its axles or other part of the underframing leaving the vehicle wheels free to rotate.

In known types of drive-on lifts, a hydraulically-operated ram is used and a cruciform type of structure is superimposed upon it for supporting the longitudinal parallel tracks upon which the vehicle wheels are supported. As viewed in plan, this structure resembles a letter H having a cross bar member in the form of a letter X, the ram being arranged at the centre of the cross bar member and the loads being applied at or towards the ends of the two parallel tracks.

Although this type of structure affords a good support to the vehicle wheel tracks, it has the disadvantage that the cruciform members occupy a large part of the space between the tracks, which space is required for the free movement of personnel attending to repairs or adjustments of the vehicle.

A second object of the present invention, therefore, is to provide a vehicle lift in which the cross bar member or beam is not cruciform in shape and in which the plan of the superstructure is like an ordinary letter H having a plain cross bar, thus affording the improved access to the under parts of the vehicle which is desired.

According to accepted principles of design such a construction would comprise a lift ram or equivalent member to the top of which would be attached the cross beam member and upon the ends of which would be laid the longitudinal tracks which in their turn would be bolted down to the said cross beam. In this manner, the total depth at the cross member is greater than under the track and a step in the trough into which the lift is lowered when it is not in use becomes unavoidable.

It should be noted that the longitudinal tracks themselves constitute beams supported at the middle and loaded at or near their ends. Owing to practical limitations their width must be greatly in excess of their depth, a condition which precludes normal design wherein the depth is essentially in excess of the width, usually at least twice.

A third object of the invention, therefore, is to provide practical means of constructiong in as economical a manner as possible, beams complying with the above mentioned essentially adverse conditions.

A fourth object of this invention is to provide such a lift in which the depth of the structure is reduced as nearly as possible to a uniform minimum, in order that the recesses or troughs into which it lowers shall not only be as shallow as possible but also shall not have any sudden serious changes in depth.

Constructional forms of the invention are shown, by way of example, on the accompanying drawings, whereon:

Fig. 1 is a sectional elevation of the upper part of a hydraulic lift which is particularly adapted to be used in garages;

Fig. 2 shows top and bottom plan views of one of the wheel tracks of the lift shown in Fig. 1, on the left of the transverse axis X—X of the track the plan view is a top plan with part of the track top flange member removed, and on the right of this axis the plan view is a plan view of the underside of the track with part of the track bottom flange member removed;

Fig. 3 is a fragmentary side elevation of the track;

Fig. 4 is a section on the line A—A in Fig. 2;

Fig. 5 is a section on the line B—B in Fig. 2;

Fig. 6 is a transverse section of a modified form of track;

Fig. 7 is a section on the line C—C in Fig. 6;

Fig. 8 is a transverse section of a further modified form of track;

Fig. 9 is a part section on the line D—D in Fig. 8;

Fig. 10 is a part section on the line E—E in Fig. 8;

Fig. 11 is a part sectional plan view of an other modified form of track; and

Fig. 12 is a section, to an enlarged scale, on the line F—F—F—F in Fig. 11.

Referring first to Figs. 1 to 5:

Each of the two longitudinal wheel-supporting tracks of the lift comprises a single top flange member 1 in the form of a relatively thin steel plate which extends the full length and the full width of the track. In constructing the track, the flange member is laid on a table and to it are welded the edges of the three V-section troughs or channel members 2 which are laid on the flange member with their open sides upward. Each of the troughs extends the whole length of the track and they are equidistantly spaced from each other transversely across the flange member. Each trough has two sloping sides 3 and 4 connected by a shorter base 5 so that in section, each trough somewhat resembles a flower pot.

The bottom flange member is formed by two plates 6 and 7 which are thicker than the top flange member 1 and are welded to the troughs. The plate 6 is supported upon the base 5 of the outermost trough and also upon the base of the central trough and the other plate 7 is supported upon the base of the innermost trough and upon the base of the central trough, there being sufficient space between the adjacent edges of the two plates to permit of each being separately welded. The length of each plate is equal to that of the top flange member 1. Thus, the above construction provides a beam which has wide top and bottom flanges 1, 6 and 7 and a number of webs (in this case six), each constituted by a side 3 or 4 of one of the troughs, which are more or less uniformly distributed over the width of the track. A rounded fillet 8 is secured by welding to the outer edge of the top flange member 1 to prevent the vehicle being pushed sideways over the edge. The ends of the tracks are closed by end plates (not shown).

As mentioned above, it is an object of the present invention to provide a structure in which the vertical height is kept to a minimum. This desideratum would not be achieved if tracks were merely laid upon a cross beam and bolted to it in conventional manner, because in that case the total depth over the tracks and cross beam would be increased.

In order to overcome that objection, the cross beam is made in the form of a headpiece casting 9, Fig. 1, which is formed on its underside with a hollow boss 10 into which the upper end of the ram tube 11 is inserted and welded. Integrally formed with the headpiece casting is the oppositely disposed track supporting structure which includes longitudinally extending inclined portions 12 terminating at their lower ends in a horizontal outwardly directed flange 13.

Each track is attached to this track supporting structure of the headpiece casting by means of five horizontal transverse, parallel bolts 14 which pass through holes 15 formed in the sides of the three V-section troughs 2. The through-bolts are arranged as close up to the underside of the top flange members as possible and are spaced equally over the whole width of the headpiece. The inner ends of these through-bolts are screwed into tapped holes 16 formed in the headpiece casting 9 and the outer ends of the bolts project out of the holes 15 in the outermost trough. The outer side of the latter is provided with a wedge-shaped fillet strip 17 presenting a vertical face 18 against which nuts 19 screwed upon the bolts 14 are adapted to bear. A second fillet strip 20 is welded to the underside of the plate 7 (Fig. 1) and is formed with a number of longitudinally, spaced tapped holes 21 into which vertical holding down cap screws 22, passed through holes formed in the said horizontal flange 13 at the bottom of the sloping portions 12 of the headpiece casting, are screwed. It will be noted that in this construction the bottom surface of the fillet strip 20 is mounted upon the said flange and that its inner edge is shaped to fit against the sloping portions 12 of the headpiece.

The inner edges of the top flange members 1 which overlap the edge of the innermost trough are situated in recesses 23 formed in, and on opposite ends of, the top 9A of the headpiece casting.

The horizontal through-bolts 14 serve to counteract a downwardly-acting lateral tipping moment, which is created at each of the sloping portions of the headpiece casting due to the weight of the track itself and also due to the weight of a vehicle placed thereon, and the vertical holding down cap screws 22 serve to counteract any longitudinal tipping moment produced in the first place by driving a vehicle on to the lift and in the second place due to a vehicle not being correctly placed (i. e., having its centre of gravity exactly over the centre of the ram 11) when lifting takes place. They are accordingly placed as widely apart as the width of the headpiece will permit, see Fig. 7.

In order to resist the tension of the through-bolts 14 and to prevent them crushing the light structure of the tracks, five rows of trough or V-shaped distance pieces are fitted and welded within and between the sections of each of the V-section troughs 2. In each row there are three distance pieces 24 within the V-section troughs and two distance pieces 25 between the troughs, so that there are five transverse rows of distance pieces each containing five pieces. These distance pieces may for convenience of manufacture be made of the same section as the longitudinal troughs 2. The distance pieces 24 are arranged in end to end relationship and one of the said through-bolts 14 passes through each row of distance pieces.

The distance pieces 24 fitted within the V-section longitudinal troughs 2 are welded in before the latter are welded to the track top member 1, but the distance pieces 25 fitted between the V-section troughs are preferably welded in after the latter have been welded to the top member.

In this connection, it should be noted that, although it is essential that the side walls of the distance pieces in each row associated with one through bolt shall be in alignment or in continuous relationship to one another so as to resist the tension of the bolts by their own compression, it may be more convenient to place the distance pieces 25 fitted between the V-section troughs in staggered relationship with regard to the distance pieces 24 within the troughs. Thus, if the side walls of the pieces 24 within the V-section troughs 2 are represented numerically counting from the left in Fig. 2, as 1—2, 3—4, 5—6, 7—8 and 9—10, the side walls of the pieces 25 between the V-section troughs would, again counting from the left, be represented as 0—1, 2—3, 4—5, 6—7, 8—9 and 10—11, the walls 1—10 inclusive of the distance pieces 25 corresponding to, and being in end to end or continuous relationship to, the walls 1—10 of the distance pieces 24 within the V-section troughs, and the walls 0 and 11 being in effect, redundant.

By this structure of transverse distance pieces the lateral strength of the longitudinal track is so augmented that it can resist the compression exerted upon it by the tension of the through bolts 14 at or near the top flange member 1 of the track, and also the reaction of the headpiece 9 exerted upon it at or near the bottom flange member 13 of the latter, these two forces forming a couple which counteracts the above mentioned downwardly-acting tipping moment.

In order that these forces comprising the couple to resist the tipping moment and the stresses arising therefrom may be kept to a minimum, it is necessary that the vertical "arm," or distance, between them shall be kept to a maximum. Hence, the above mentioned fillet 20 is preferably welded to the lower side of the bottom flange member 7 as shown in Figs. 1 and 5, i. e., outside and below the bottom of the innermost trough 2.

The modified track shown in Figs. 6 and 7 comprises only two V-section troughs 2A. The upper edges of these troughs are welded to the top flange plate 1A, as in the previous construction, but the bottom flange member 27 is fitted between the bases of the troughs and welded thereto. Usually in this construction the longitudinal troughs 2A are of such large size that they do not constitute a suitable section from which to cut the transverse distance pieces. These latter must therefore be made specially and can accordingly be made of a smaller section, preferably U-shaped and fitting much closer round the through-bolts. The distance pieces 24A fitted within the troughs 2A are inverted and have their bases 30 adjacent to the upper flange plate, while the distance pieces 25A between the troughs are fitted the other way up with their bases 32 adjacent the bottom flange plate 27. Since the sides 28 and 29 of the distance pieces 24A are parallel, the staggered arrangement mentioned in conjunction with the three-trough construction shown in Figs. 1 to 5 does not arise.

This modified form of track is attached to the headpiece 9C in similar fashion to the three-trough design previously described, but the following modifications are convenient and may be incorporated. Owing to the large size of the longitudinal troughs 2A it is feasible to use larger transverse bolts 14A, and as they are larger there may be fewer of them spaced further apart. Consequently, in place of the single bevelled strip 17 which accommodated all the bolts in the previous construction it is more convenient to use separate bevelled washers 31, one to each bolt.

Further, owing to the larger section of the troughs 2A and the greater depth of the track member it is feasible to put the fillet 26 inside the inner trough 2A above the level of the lower flange member and to bolt the track member down to the horizontal flange 13A by means of screws passing through the trough and screwed into tapped holes in the fillet 26.

It will be understood, however, that the arrangement of the fillet externally as described in the three-trough construction of Figs. 1 to 5 is also possible in this case.

Similarly, it will be understood that the arrangement of the fillet strip as described with reference to Figs. 6 and 7 is also possible in the three-trough construction especially in cases of lifts designed for light loads.

In Figs. 8 to 10 an alternative method of constructing a two-trough track member is shown. In this case the upper flange plate 44 is made integral with the two outer depending walls 42 and 43 and the two trough members 2B are completed by the addition of angle pieces having a base 45 and inner wall 46 which are integral with one another and are welded respectively to the lower edge of the outer wall 43 and to the upper flange member 44.

The troughs as thus made up do not admit of access to their interiors for the purpose of fitting V- or U-shaped distance pieces as in the previous constructions. The use of transverse through-bolts is therefore dispensed with and in their place short cap screws 35 running through plain holes 36 in the headpiece and screwed into tapped holes 34 in a fillet piece 33, are used. The fillet piece 33 is welded to the upper flange plate 44 and the inner wall 42 in the near upper corner of the inner trough 2B before the base and side piece 45 and 46 is added, as also are gussets 37 and 38 in the immediately vicinity of the screws 35.

Between the side walls 46 of the trough members are fitted U-shaped distance pieces 40, having vertical side walls 40A and 40B as shown in Fig. 10, and within the inner trough member 2B, there are also fitted gussets 39 which are in end to end relationship with the vertical walls 40A and 40B and are welded to the base 45 and wall 46, before the latter are welded in place to the side wall 42 and upper flange 44 respectively. The bottom flange member 41 is welded at its edges as in the previous construction to the bases 45 of the trough members. It may also be plug welded to the distance pieces 40.

Gussets similar to 38 and 39 might be similarly fitted within the outer trough member, but as the magnitude of the lateral bending movement in this zone is small or negligible, such stiffening is usually unnecessary.

It will be understood that in both of these two trough constructions a rounded fillet, similar to the fillet 8 in Fig. 5, may be fitted, although not shown in Figs. 6 and 8.

A further modified track comprising two V-section troughs is shown in Figs. 11 and 12. In this construction, the track top flange member 50 has integral depending side walls 51 and 52 constituting part of the longitudinally extending web structure, the balance of which is formed by longitudinally extending angle pieces having bases and inner walls 53 and 54 integral with one another and the bottom flange member 55 is fitted between and welded to them, all as in the previously described construction shown in Figs. 8 to 10.

In this construction also, a fillet 56 for the attachment cap screws 57 is welded in the upper near corner of the inner trough member and a fillet 56A for the holding down cap screws 57A is also welded within the base of the said trough member, similar to the construction of Figs. 8 to 10, but the attachment cap screws are placed at right angles to the sloping wall 51 instead of parallel to the upper flange member. This arrangement enables the screws to be placed to slightly better advantage for resisting the lateral tipping movement and also provides rather better access to their heads for spanner engagement.

In this construction, the attachment screws 57 are spaced as widely apart as the width of the headpiece will permit and are placed to correspond with the holding down screws as shown by the position of the tapped holes 58 and 59 respectively in Fig. 11.

Four transverse distance pieces 60 are arranged one on either side of each pair of holding down and attachment screws respectively. These pieces are trapezoidal in shape and are welded at 61 to the fillet 56 and at 62 to the upper flange plate 50 before the base and side piece 53, 54 is welded in place, and they are flanged at 63 to butt against the said side wall 54 and plug welded thereto at 64.

The distance pieces 65 within the outer trough are similarly welded to the side 52 and top flange plate 50 before the base and second side piece is added, and they are flanged to meet the second side 54 and plug welded thereto as in the case of the distance pieces 60 described above.

The distance pieces 66 between the troughs are similarly welded to the top flange plate and side walls 54 before the bottom flange plate is attached and are similarly flanged to meet it and plug welded to the bottom flange plate after it is attached.

I claim:

1. In a vehicle lift having a ram, the combination of a headpiece on the upper end of said ram including oppositely disposed track supporting structure, a pair of longitudinally extending vehicle supporting tracks, each of said tracks including longitudinally extending vertically spaced tension and compression members, means forming a plurality of longitudinally extending transversely spaced webs disposed between said tension and compression members for resisting the forces acting thereon, and reinforcing structure for said tracks including a plurality of distance pieces extending between said longitudinally extending webs intermediate the ends thereof and arranged in transverse relation with respect thereto for resisting transverse forces acting on said tracks, and means for attaching said vehicle supporting tracks to the supporting structure on said head.

2. The combination as defined in claim 1, wherein the oppositely disposed track supporting structure on said headpiece includes oppositely directed flanges for engaging the underside of said vehicle supporting tracks.

3. The combination as defined in claim 1, wherein the longitudinally extending webs conform substantially to the length of said tension and compression members and are disposed substantially across the width thereof.

4. The combination as defined in claim 1, wherein the longitudinally extending webs are grouped in parallel relation to the longitudinal axis of said tension and compression members.

5. The combination as defined in claim 1, wherein the longitudinally extending webs are inclined to a longitudinal plane normal to the tension and compression members.

6. The combination as defined in claim 1, wherein the means forming the longitudinally extending webs comprises a plurality of longitudinally extending members generally channel shaped in cross section disposed between and fixed to said tension and compression members.

7. The combination as defined in claim 6, wherein the transversely extending reinforcing structure for said tracks is disposed along the portions of the tracks engaging the supporting structure on said headpiece and comprises a plurality of distance pieces extending between and fixed to the inner walls of said channel shaped members, said distance pieces being arranged in aligned relation transversely of said tracks, and other distance pieces extending between adjacent channel shaped members and fixed to the outer side walls thereof, said last mentioned distance pieces also being arranged in aligned relation transversely of the tracks.

8. The combination as defined in claim 1, wherein the means forming the longitudinally extending webs comprises a plurality of longitudinally extending members generally channel shaped in cross section having a base and sloping sides terminating in parallel longitudinally extending edges, said channel shaped members being disposed between said tension and compression members with their bases secured to one of said latter members and their parallel edges secured to the other.

9. The combination as defined in claim 8, wherein the compression members of each of said vehicles supporting tracks comprise two or more longitudinally extending plates and the bases of said channel shaped members are secured to said compression members.

10. The combination as defined in claim 1, wherein the means for attaching said vehicle supporting tracks to the supporting structure on said head includes members adapted for threaded engagement and extending from said headpiece into said tracks in substantially normal planes.

11. The combination as defined in claim 1, wherein the means for attaching said vehicle supporting tracks to the supporting structure on said headpiece includes a plurality of longitudinally spaced bolts extending transversely of said tracks and having threaded engagement with said headpiece.

12. The combination as defined in claim 1, wherein the means for attaching said vehicle supporting tracks to the supporting structure on said headpiece includes a plurality of longitudinally spaced cap screws projecting from said headpiece and having threaded engagement with said tracks.

13. The combination as defined in claim 1, wherein the transversely extending reinforcing structure for said tracks is disposed along the portion of said tracks engaging the supporting structure on said headpiece and comprises a plurality of rows of distance pieces between said longitudinally extending web forming means, the distance pieces in each row being arranged in aligned relation transversely of said tracks.

14. The combination as defined in claim 13, wherein said distance pieces have edges conforming in shape to the space defined between said tension and compression members and said longitudinally extending web forming means, the edges of said distance pieces being secured to the sides of said web forming means.

15. In a vehicle lift having a ram, the combination of a headpiece on the upper end of said ram including oppositely disposed track supporting structure, a pair of longitudinally extending vehicle supporting tracks, each of said tracks including a longitudinally extending tension member having depending side walls and a compression member vertically spaced from the tension member, means including said depending side walls forming a plurality of longitudinally extending transversely spaced webs connecting said tension and compression members for resisting forces acting thereon, and reinforcing structure for said tracks including a plurality of distance pieces extending between said longitudinally extending webs intermediate the ends thereof and arranged in transverse relation with respect thereto for resisting transverse forces acting on said tracks, and means for attaching said vehicle supporting tracks to the supporting structure on said headpiece.

16. The combination as defined in claim 15, wherein the vehicle supporting tracks are attached to the supporting structure on said headpiece by detachable means having threaded engagement with said tracks and projecting therein from said headpiece in planes angularly disposed with respect to each other.

17. The combination as defined in claim 15, wherein the vehicle supporting tracks are attached to the supporting structure on said headpiece by detachable means having threaded engagement with said tracks and projecting therein from said headpiece in planes angularly disposed with respect to each other, and said distance pieces extend transversely of said longitudinally extending webs in planes in close proximity to said attaching means.

18. In a vehicle lift having a ram, the combination of a headpiece on the upper end of said ram including oppositely disposed track supporting structure, a pair of longitudinally extending vehicle supporting tracks, each of said tracks including a longitudinally extending tension member having depending side walls, a pair of longitudinally extending angle pieces having edges connected to the inner side of said tension members and to said side walls to form longitudinally extending webs co-operating with said side walls in resisting the forces acting on said tracks, means forming a compression member vertically spaced from said tension member, and reinforcing structure for said tracks including a plurality of distance pieces extending between said webs and side walls intermediate the ends thereof and arranged in transverse relation with respect thereto for resisting transverse forces acting on said tracks, and means for attaching said vehicle supporting tracks to said headpiece.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 1,047,661 | Landstra | Dec. 17, 1912 |
| 1,784,554 | Stukenborg | Dec. 9, 1930 |
| 1,874,572 | Montgomery | Aug. 30, 1932 |
| 1,884,192 | Perry | Oct. 25, 1932 |
| 1,955,948 | Collins | Apr. 24, 1934 |
| 2,107,210 | Palm | Feb. 1, 1938 |
| 2,408,757 | Dunlop | Oct. 8, 1946 |